United States Patent
Young et al.

(10) Patent No.: US 10,817,316 B1
(45) Date of Patent: Oct. 27, 2020

(54) VIRTUAL ASSISTANT MOOD TRACKING AND ADAPTIVE RESPONSES

(71) Applicant: Wells Fargo Bank, N.A., San Francisco, CA (US)

(72) Inventors: Michelle M. Young, Houston, TX (US); Paul Vittimberga, Oakland, CA (US); Wayne Barakat, Novato, CA (US); David Newman, Walnut Creek, CA (US); Vincent Le Chevalier, San Jose, CA (US); Brian P. McMahon, Berkeley, CA (US)

(73) Assignee: Wells Fargo Bank, N.a., San Francisco, CA (US)

( * ) Notice: Subject to any disclaimer, the term of this patent is extended or adjusted under 35 U.S.C. 154(b) by 29 days.

(21) Appl. No.: 15/797,911

(22) Filed: Oct. 30, 2017

(51) Int. Cl.
*G06F 16/24* (2019.01)
*G06F 9/451* (2018.01)
*G06F 3/01* (2006.01)
*G06F 16/2457* (2019.01)
*G06F 3/16* (2006.01)

(52) U.S. Cl.
CPC .............. *G06F 9/453* (2018.02); *G06F 3/011* (2013.01); *G06F 16/24575* (2019.01); *G06F 3/167* (2013.01)

(58) Field of Classification Search
CPC ........ G06Q 20/00; G06Q 30/00; G06Q 40/00; G06F 19/00; G06F 17/20; G06F 17/30; G06F 3/04; G06F 16/20; G06F 16/30
See application file for complete search history.

(56) References Cited

U.S. PATENT DOCUMENTS

| | | | |
|---|---|---|---|
| 6,411,687 B1 | 6/2002 | Bohacek et al. | |
| 7,940,186 B2 | 5/2011 | Aaron et al. | |
| 8,054,964 B2 | 11/2011 | Flockhart et al. | |
| 8,767,948 B1 | 7/2014 | Riahi et al. | |
| 9,124,697 B2 | 9/2015 | Scott et al. | |
| 9,196,248 B2 | 11/2015 | Fischer et al. | |
| 9,386,152 B2 | 7/2016 | Riahi et al. | |
| 9,405,962 B2 | 8/2016 | Balasubramanian et al. | |
| 9,412,116 B2 | 8/2016 | Jain | |
| 9,549,068 B2 | 1/2017 | Krishnan et al. | |
| 2003/0046401 A1 | 3/2003 | Abbott et al. | |
| 2006/0074788 A1 | 4/2006 | Grizack et al. | |
| 2008/0096533 A1 | 4/2008 | Manfredi | |
| 2011/0125643 A1* | 5/2011 | Cameo | G06Q 20/10 705/44 |

(Continued)

OTHER PUBLICATIONS

Angga, Antonius P., "Design of Chatbot with 3D Avatar, Voice Interdace, and Facial Expression", 2015 International Conference on Science in Information Technology (ICSITech), (2015), 5 pgs.

(Continued)

*Primary Examiner* — Sanchita Roy
(74) *Attorney, Agent, or Firm* — Schwegman Lundberg & Woessner, P.A.

(57) ABSTRACT

Among other things, embodiments of the present disclosure can help improve the functionality of virtual assistant (VA) systems by recognizing and tracking a user's mood and adapting its responses accordingly. Embodiments of the present disclosure may utilize data in real-time or near-real-time to identify a user's mood, as well as tracking a user's preferences and reactions in past interactions with the VA or in other contexts.

14 Claims, 4 Drawing Sheets

(56) References Cited

U.S. PATENT DOCUMENTS

| | | | |
|---|---|---|---|
| 2013/0266925 | A1 | 10/2013 | Nunamaker, Jr. et al. |
| 2014/0188552 | A1 | 7/2014 | Chan et al. |
| 2014/0365226 | A1* | 12/2014 | Sinha .................. G10L 25/00 704/275 |
| 2015/0134456 | A1 | 5/2015 | Baldwin |
| 2015/0142446 | A1 | 5/2015 | Gopinathan et al. |
| 2015/0179082 | A1* | 6/2015 | Byron .................. G09B 7/00 434/322 |
| 2015/0382147 | A1 | 12/2015 | Clark et al. |
| 2016/0063874 | A1 | 3/2016 | Czerwinski et al. |
| 2016/0103996 | A1* | 4/2016 | Salajegheh ......... G06F 11/3024 726/25 |
| 2016/0253552 | A1 | 9/2016 | Rihn et al. |
| 2016/0307028 | A1* | 10/2016 | Fedorov ................. G06F 16/11 |
| 2016/0330144 | A1 | 11/2016 | Dymetman et al. |
| 2016/0352656 | A1* | 12/2016 | Galley .................. H04L 51/02 |
| 2017/0027528 | A1 | 2/2017 | Kaleal, III et al. |
| 2017/0054848 | A1 | 2/2017 | Meng et al. |
| 2017/0069340 | A1 | 3/2017 | Nowson et al. |
| 2018/0331839 | A1* | 11/2018 | Gao .................. H04L 12/1813 |
| 2018/0336904 | A1* | 11/2018 | Piercy .................. G10L 17/22 |

OTHER PUBLICATIONS

Goh, "An intelligent virtual financial advisor system (IVFAS)", 2nd IASTED International Conference on Neural Networks and Computational Intelligence, NCI 2004, 146-51, (2004), 6 pgs.

Maserati, Frederic, "Personal Robo-Advisors are arriving and will radically change banks' customer relations", [Online]. [Accessed Jul. 23, 2019]. Retrieved from the Internet: URL: https: www.keyrus.com en post ?post_pk=3903, (3 16 17), 6 pgs.

Metze, Florian, "Getting Closer—Tailored Multi-Modal Human-Computer Interaction", In Proc."Striking a C [h] ord" CHI 2007 Workshop on non-verbal acoustic interaction. San Jose, CA. 2007, (2007), 4 pgs.

Viau, Bernard, "Virtual Intelligent Assistants for the financial world", [Online]. [Accessed Jul. 23, 2019]. Retrieved from the Internet: URL: https: www.linkedin.com pulse virtual-intelligent-assistants-financial-world-bernard-viau, (Jan. 31, 2017), 11 pgs.

Vidrascu, Laurence, "Annotation and Detection of Blended Emotions in Real Human-Human Dialogs Recorded in a Call Center", 2005 IEEE International Conference on Multimedia and Expo, (2005), 4 pgs.

* cited by examiner

VIRTUAL ASSISTANT MOOD TRACKING AND ADAPTIVE RESPONSES

BACKGROUND

The popularity of virtual assistants (VAs) continues to grow. Virtual assistants are software-implemented systems that interact with users (often via voice recognition) to answer questions and perform tasks and services for users. Conventional VAs, however, are unable to dynamically adjust their responses based on a user's mood.

For example, a VA overseeing a user's financial transactions may fail to recognize a user is upset or angry, and deliver an inappropriate (if perhaps accurate) response to a question or request from the user, thus further antagonizing the user. Embodiments of the present disclosure address these and other issues.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure can help improve the functionality of virtual assistant (VA) systems by recognizing and tracking a user's mood and adapting its responses accordingly. Embodiments of the present disclosure may utilize data in real-time or near-real-time to identify a user's mood, as well as tracking a user's preferences and reactions in past interactions with the VA or in other contexts.

Figure 1A:
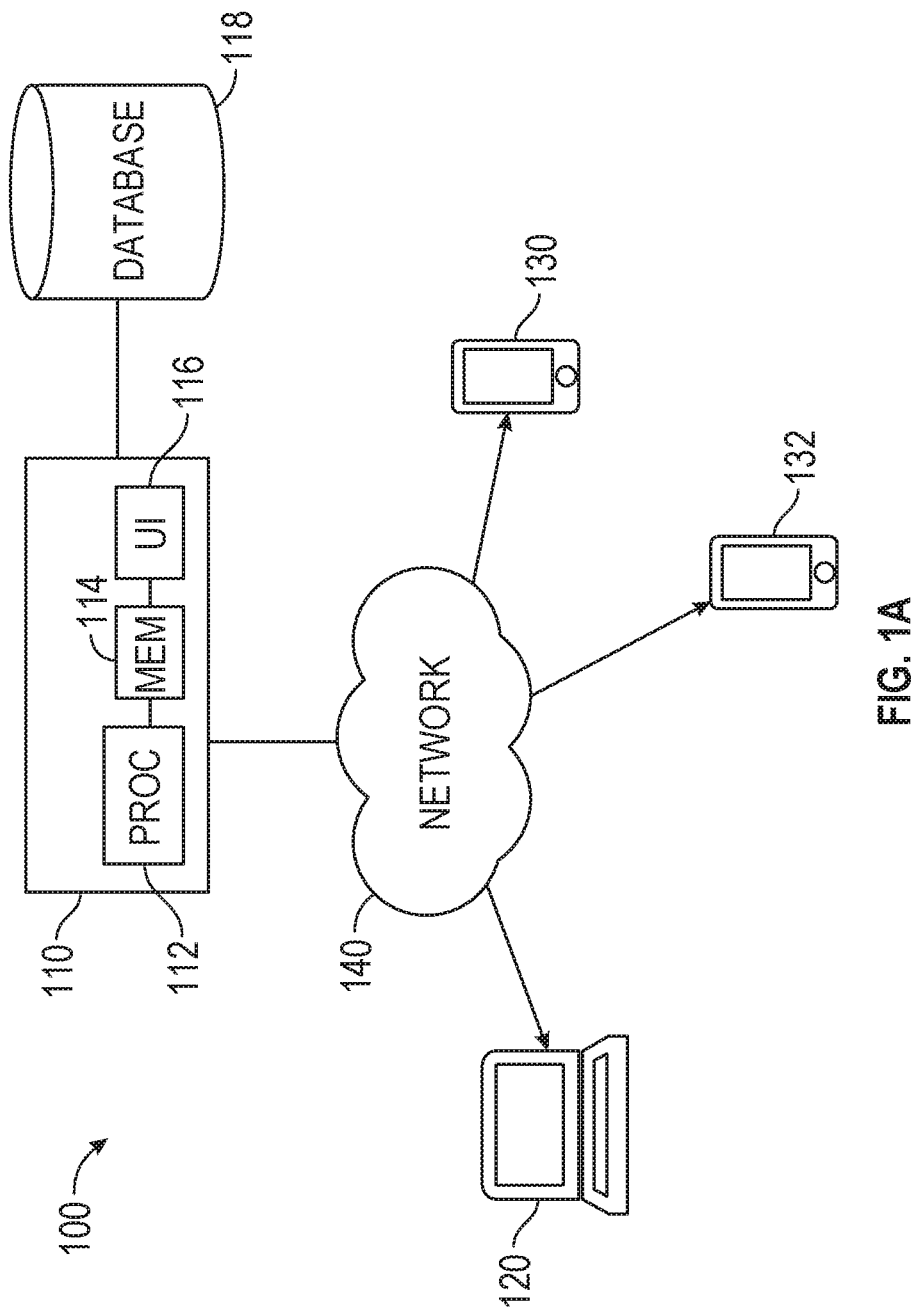
FIG. 1A illustrates a block diagram of an exemplary system according to various aspects of the disclosure.

FIG. 1A is a block diagram of system which may be used in conjunction with various embodiments. While FIG. 1A illustrates various components of a computer system, it is not intended to represent any particular architecture or manner of interconnecting the components. Other systems that have fewer or more components may also be used.

In FIG. 1A, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 122, 130.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provide the user with data, notifications, and other information. Typical I/O devices may include touch screen displays, display screens, mice, keyboards, modems, network interfaces, printers, scanners, video cameras and other devices.

The system 110 may communicate with one or more client computing devices 120, 122, 130 as well as other systems and devices in any desired manner, including via network 140. The system 110 and/or computing devices 120, 122, 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 140 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®. Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2:
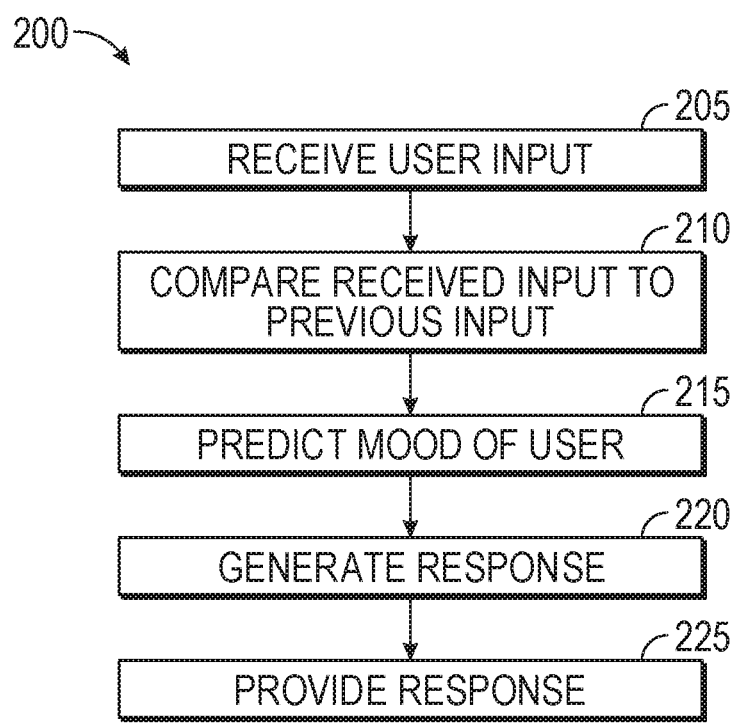
FIG. 2 is a flow diagram of an exemplary process according to various aspects of the disclosure.

FIG. 2 depicts an exemplary process according to various aspects of the present disclosure. In this example, method 200 includes receiving input from a user directed to a virtual assistant (205), comparing the received input to previously-received input from the user (210), predicting the user's mood based on the comparison (215), generating a response to the user's input based on the predicted mood (220), and providing the response to the user (225). The steps of method 200 may be performed in whole or in part, may be performed in conjunction with some or all of the steps in other methods, and may be performed by any number of different systems, such as the systems described in FIGS. 1A and/or 3.

In the example shown in FIG. 1A for instance, a virtual assistant may be implemented entirely via software operating on a user's computing device 120, 122, or 130, or via a combination of software on a user's computing device in conjunction with software operating on the server computing system 110. In some embodiments, a virtual assistant operates on the server computer system 110 and is accessed via a web-based interface on the user's client computing device 120, 122, 130.

Figure 1B:
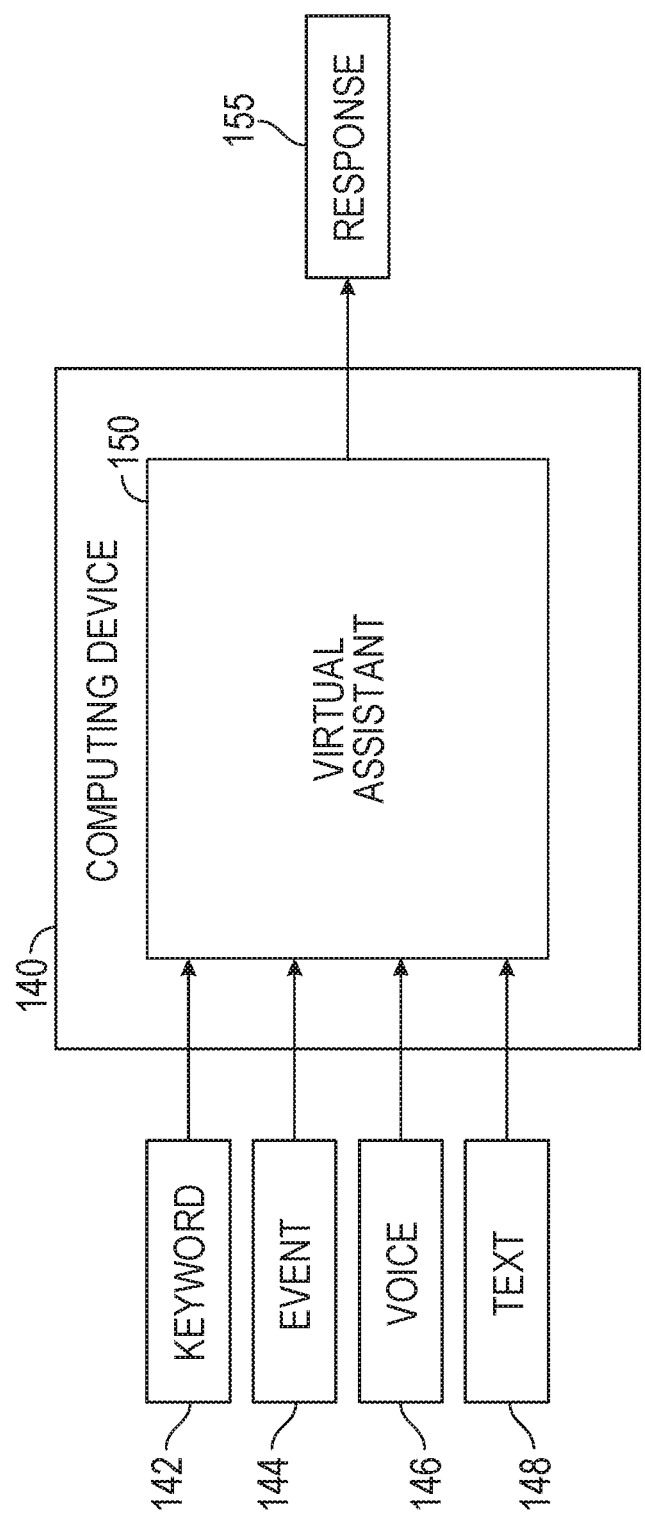
FIG. 1B illustrates a block diagram of a virtual assistant operating on a computing device according to various aspects of the disclosure.

FIG. 1B illustrates one example of a virtual assistant operating on a computing device 140. The computing device 140 may include one or more systems, such as user's computing device 120, 122, 130, and/or server computing system 110. In this example, the virtual assistant 150 is implemented via software operating on the computing device 140. In other embodiments, the virtual assistant may be implemented via hardware, software, or a combination of the two. The virtual assistant 150 receives inputs from a user, namely keyword inputs 142, event inputs 144, voice inputs 146, and/or text inputs 148. The virtual assistant 150 analyzes the inputs and provides a response 155 to the user.

In the method 200 shown in FIG. 2, the system (e.g., server computer system 110 in FIG. 1A) receives an input from a user directed to a virtual assistant operating on the system (205). A variety of inputs from the user may be received, such as a request for information from the virtual assistant (e.g., "where is the closest restaurant?", "what is the balance of my checking account?", etc.), and/or a request for the virtual assistant to perform a task ("reserve a table for me at the restaurant you just identified," "move $100 from savings to checking," etc.). Inputs from a user may be received in a variety of different formats, such as text and audio.

The system analyzes the user's input to help predict or determine (215) a mood of the user. The prediction of the user's mood may be determined using any suitable scale or measure. For example, the user's mood may be determined with a rating on a scale of one (worst mood) to ten (best mood). A probability associated with the user's mood rating may also be determined. For example, the system may determine a user has an 80% probability of having a mood of 8 or higher on the 1-10 scale.

In some embodiments, the system may predict the user's mood based on a comparison (210) of the user's latest input to previously-received inputs from the user. Though the system can help provide a better VA experience to the user, some embodiments of the system may also seek approval from the user to access any data or information used to determine the user's mood (including those described below). In this manner, the user can prevent the system from accessing using some or all of the data sources to help generate (220) its responses for the user.

The system may analyze a variety of features of a user's inputs and predict the user's mood based on some or all of such features. For example, the system may analyze features such as keywords used by the user in speech or text communications. The keywords may be analyzed to help determine whether they are indicative of the user's mood. For example, phrases used by, the user such as "this is unacceptable" or "how frustrating," may be interpreted by the system as an indicator the user is upset or angry.

The system may also perform a voice stress analysis on a user's audio input. In some embodiments, the VA system compares the user's latest voice input to a baseline recording of the user's voice. Machine learning techniques are used to determine, based on the VA's prior interactions with the user, the manner in which different voice stress conditions reflect the mood of different users. For example, one user may naturally speak loudly, while a second user raising their voice may be determined to be indicative of the user being upset or angry.

The system may determine a user's mood based on data regarding the user from a sensor in communication with the system. For example, the system may receive data directly from a user's fitness device. Additionally or alternatively, the system may receive data from a sensor coupled to the user's computing device. The system may receive and analyze data from a variety of different sensors, including a blood pressure sensor, a body temperature, a heart rate monitor, and/or a sleep monitor.

The system may predict the mood of a user based on an event associated with the user. For example, if the user has received a large volume of medical bills and has a low account balance, the VA system may determine that the user's mood (and thus receptivity to responses or other content from the VA system) is affected. Additional events may include an account of the user being overdrawn, a user's status in achieving (or failing to achieve) a financial goal, a divorce, a loss of a family member, and/or a change in employment. The system may determine whether (and to what extent) such events and data may affect the user's mood (whether positively or negatively), and consequently the user's receptivity to receiving different types of responses to the user's input and other content from the VA.

The system may also consider other data in determining the user's mood, such as ambient noise in the user's environment (e.g., loud noises may be indicative of the user being under stress), the temperature in the user's environment (some users may be more receptive to good or bad information depending on their comfort level). The system also analyze the mood determinations for other users associated with the user, such as the user's friends or family (e.g., the mood of a user's spouse may be determined to have a likely effect on the user's own mood). The system may further analyze content posted by the user to social media sites, as well as information regarding the user's demographics. In one example, a user's posts regarding events affecting the user (e.g., that the user is excited to be starting a new job) may be taken into account in identifying events that can be analyzed to predict the user's mood.

The system may generate (220) a variety of different types of responses, different formats of responses, and different content within the responses. In various embodiments, the system generates content and responses, and performs tasks and other actions based at least in part on the determined mood of the user. In some embodiments, the system generates a plurality of possible responses, and calculates a probability for each respective response that a user will be receptive to the respective response. In such cases, the system may select one or more responses to provide (225) to a user based on the response's of receptiveness. For example, the system may generate three responses to a user's input, and determine a probability of acceptance for each response as 20%, 60%, and 80%, respectively. The system may automatically pick the response having the highest likelihood to be received well by the user (i.e., the 80% probability response), or it may select from responses that have a probability of acceptance that meets or exceeds a threshold (e.g., either the 60% or 80% response where the minimum threshold is 60%).

In some embodiments, the VA system uses is determination of a user's current or predicted future mood to determine whether to engage the user and, if so, how. Determining the likelihood that a response will be well-received by a user may vary depending on the user. For example, some users may be more receptive when angry, other users may prefer to be left alone when angry. The VA system may utilize machine learning techniques to find a correlation between receptivity and mood for particular users.

The system may provide (225) a response to the user in a variety of different ways. In some embodiments, the system provides a response to a user's input in the same format (e.g., audio, text, etc.) as the input. In this context, a "response" generally refers to any output provided by the system to the user. Accordingly, the virtual assistant system may provide a user information, perform a task, or take other action without a user necessarily providing any input. In another example, demographic information (such as the user's age, employment status, etc.) may be used in generating (220) the response to identify a predetermined time to provide the response to the user when the user is likely to be available and receptive to the response.

Figure 3:
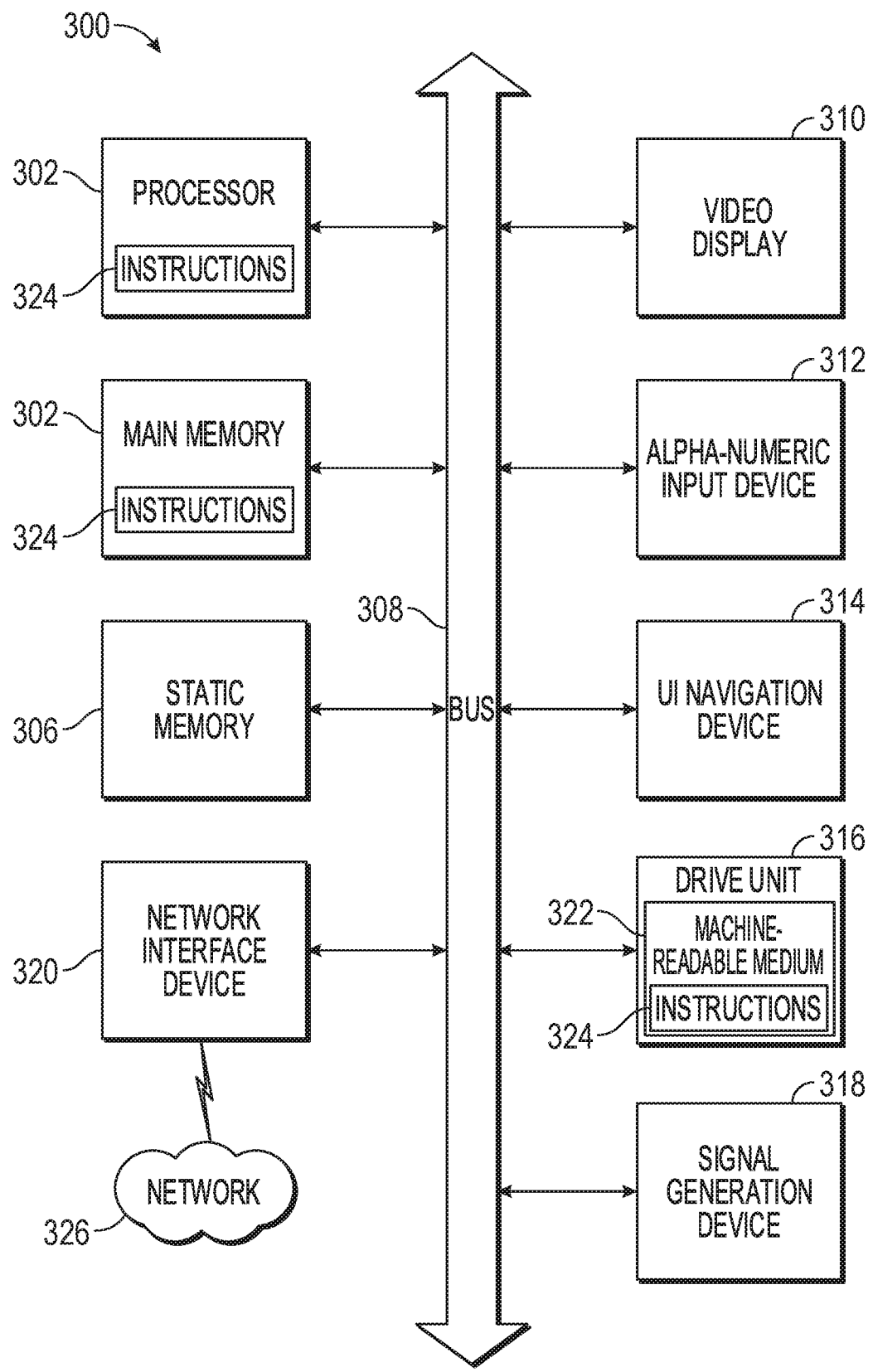
FIG. 3 is a block diagram of an exemplary machine according to various aspects of the disclosure.

FIG. 3 is a block diagram illustrating exemplary components of a computing system 300 that may operate in conjunction with embodiments of the present disclosure. System 300 (in whole or in part) may be (or include) any of the computing devices 110, 120, 122, 130 shown in FIG. 1A. In this example, system 300 reads instructions 324 from a machine-readable medium (e.g., a tangible, non-transitory, machine-readable storage medium) 322 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some, all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (RFIC), or any suitable combination thereof. System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance, Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system comprising:
a processor; and
memory coupled to the processor and storing instructions that, when executed by the processor, cause the system to perform operations comprising:
receiving an input from a first user directed to a virtual assistant operating on the system, the virtual assistant adapted to assist the first user in financial matters;
comparing the received input to a previously-received input from the first user;
determining an occurrence of an event associated with the first user, the event including one or more of:
a status of a financial account of the first user or a status of the first user in achieving a financial goal;
determining social media content posted by the first user regarding the event;
determining a second user that is a friend or family member of the first user and is likely to have an effect on a mood of the first user;
determining a mood for the second user that is associated with the first user;
predicting the mood of the first user based on the comparison, the mood for the second user, the social media content posted by the first user regarding the event, and the event;
generating a plurality of responses to the received input based on the predicted mood of the first user;
determining, for each particular one of the plurality of responses, a probability that the response will be well received by the first user, the probability using a machine-learned model trained to find a correlation between receptivity and mood;
selecting a response from the plurality of response that has a highest probability that the response will be well received; and
providing the selected response to the first user via the virtual assistant.

2. The system of claim 1, wherein the input includes one or more of: a request for information from the virtual assistant, or a request for the virtual assistant to perform a task.

3. The system of claim 1, wherein the input includes one or more of:
audio input, and text input.

4. The system of claim 1, wherein predicting the mood of the first user is further based on data regarding the first user received from a sensor in communication with the system.

5. The system of claim 4, wherein the sensor includes one or more of: a blood pressure sensor, a body temperature sensor, a heart rate monitor, and a sleep monitor.

6. The system of claim 1, wherein generating the plurality of responses includes identifying a predetermined time to provide the response to the first user.

7. The system of claim 1, wherein determining the mood of the first user is further based on one or more of:
ambient noise in an environment of the first user, a room temperature in the first user's environment a social media post by the first user, and demographic information for the first user.

8. A method comprising:
receiving, by a computer system, an input from a first user directed to a virtual assistant operating on the computer system, the virtual assistant adapted to assist the first user in financial matters;
comparing, by the computer system, the received input to a previously-received input from the first user;
determining an occurrence of an event associated with the first user, the event including one or more of:
a status of a financial account of the first user or a status of the first user in achieving a financial goal;
determining social media content posted by the first user regarding the event;
determining a second user that is a friend or family member of the first user and is likely to have an effect on a mood of the first user;
determining a mood for the second user that is associated with the first user;

predicting the mood of the first user, by the computer system based on the comparison, the mood for the second user, the social media content posted by the first user regarding the event, and the event;

generating, by the computer system, a plurality of responses to the received input based on the predicted mood of the first user;

determining, for each particular one of the plurality of responses, a probability that the response will be well received by the first user, the probability using a machine-learned model trained to find a correlation between receptivity and mood;

selecting a response from the plurality of response that has a highest probability that the response will be well received; and providing, by the computer system, the selected response to the first user via the virtual assistant.

9. The method of claim 8, wherein the input includes one or more of:
a request for information from the virtual assistant, or a request for the virtual assistant to perform a task.

10. The method of claim 8, wherein predicting the mood of the first user is further based on data regarding the user received from a sensor in communication with the system.

11. The method of claim 10, wherein the sensor includes one or more of: a blood pressure sensor, a body temperature sensor, a heart rate monitor, and a sleep monitor.

12. The method of claim 8, wherein generating the plurality of responses includes identifying a predetermined time to provide the response to the first user.

13. The method of claim 8, wherein determining the mood of the first user is further based on one or more of:
ambient noise in an environment of the first user, a room temperature in the first user's environment, a social media post by the first user, and demographic information for the first user.

14. A non-transitory computer-readable medium storing instructions that, when executed by a computer system, cause the computer system to perform operations comprising:

receiving an input from a first user directed to a virtual assistant operating on the computer system, the virtual assistant adapted to assist the first user in financial matters;

comparing the received input to a previously-received input from the first user; determining an occurrence of an event associated with the first user, the event including one or more of:
a status of a financial account of the first user or a status of the first user in achieving a financial goal;

determining social media content posted by the first user regarding the event;

determining a second user that is a friend or family member of the first user and is likely to have an effect on a mood of the first user;

determining a mood for the second user that is associated with the first user;

predicting, the mood for the first user based on the comparison, the mood for the second user, the social media content posted by the first user regarding the event, and the event;

generating a plurality of responses to the received input based on the predicted mood of the first user;

determining, for each particular one of the plurality of responses, a probability that the response will be well received by the first user, the probability using a machine-learned model trained to find a correlation between receptivity and mood;

selecting a response from the plurality of response that has a highest probability that the response will be well received; and providing the selected response to the first user via the virtual assistant.

* * * * *

UNITED STATES PATENT AND TRADEMARK OFFICE
CERTIFICATE OF CORRECTION

PATENT NO. : 10,817,316 B1
APPLICATION NO. : 15/797911
DATED : October 27, 2020
INVENTOR(S) : Young et al.

Page 1 of 1

It is certified that error appears in the above-identified patent and that said Letters Patent is hereby corrected as shown below:

On the Title Page

In Column 2, under "Other Publications", Line 2, delete "Interdace," and insert --Interface,-- therefor Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*